(12) United States Patent
Ishijima

(10) Patent No.: US 8,526,047 B1
(45) Date of Patent: Sep. 3, 2013

(54) PRINT CONTROL APPARATUS, IMAGE FORMING SYSTEM, NON-TRANSITORY COMPUTER READABLE MEDIUM

(71) Applicant: Fuji Xerox Co., Ltd., Tokyo (JP)

(72) Inventor: Hiroyasu Ishijima, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 13/675,361

(22) Filed: Nov. 13, 2012

(51) Int. Cl.
*G06K 1/00* (2006.01)

(52) U.S. Cl.
USPC ........................................ 358/1.15; 358/1.13

(58) Field of Classification Search
None
See application file for complete search history.

(56) References Cited

U.S. PATENT DOCUMENTS 7,663,779 B2 * 2/2010 Nagao et al. ................ 358/1.2
2003/0154185 A1 * 8/2003 Suzuki et al. ................ 707/1

FOREIGN PATENT DOCUMENTS

JP    A-2005-74626    3/2005
JP    A-2007-223163   9/2007

* cited by examiner

*Primary Examiner* — Douglas Tran
(74) *Attorney, Agent, or Firm* — Oliff & Berridge, PLC

(57) ABSTRACT

A print control apparatus includes the following components. A receiving unit receives a print request. A print data generating unit generates print data for outputting images on print sheets on the basis of the received print request. An obtaining unit obtains information on the printing speed of a printer that is to print the images on the print sheets on the basis of the generated print data. A deciding unit decides, on the basis of the obtained information on the printing speed, page intervals at which reduced-size images are to be generated. A reduced-size image generating unit generates, on the basis of the received print request, at the decided page intervals, reduced-size images of the images to be output on the print sheets. A display unit displays the generated reduced-size images.

10 Claims, 9 Drawing Sheets

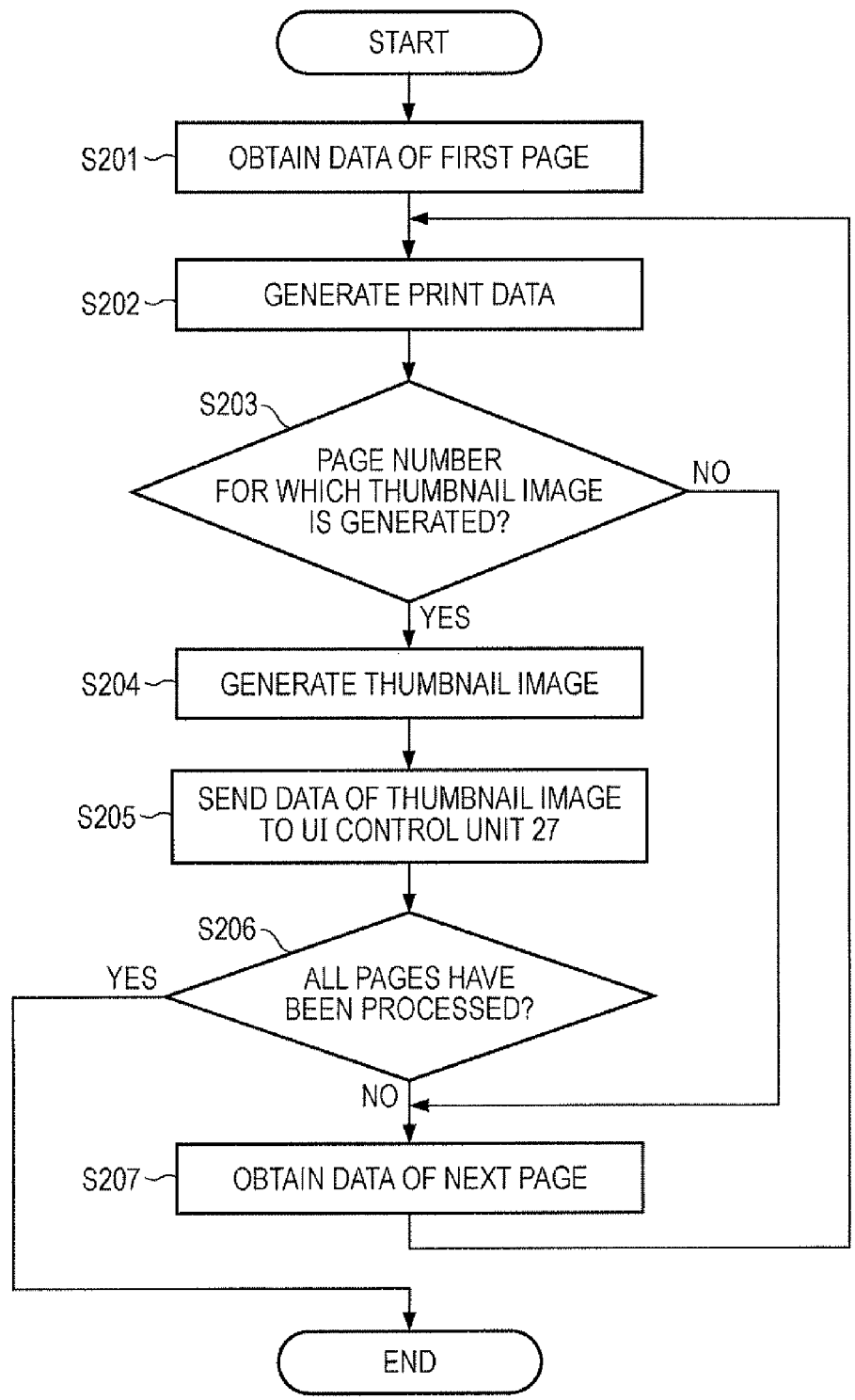

PRINT CONTROL APPARATUS, IMAGE FORMING SYSTEM, NON-TRANSITORY COMPUTER READABLE MEDIUM

CROSS-REFERENCE TO RELATED APPLICATIONS

This application is based on and claims priority under 35 USC 119 from Japanese Patent Application No. 2012-065330 filed Mar. 22, 2012.

BACKGROUND

Technical Field

The present invention relates to a print control apparatus, an image forming system, and a non-transitory computer readable medium.

SUMMARY

According to an aspect of the invention, there is provided a print control apparatus including a receiving unit, a print data generating unit, an obtaining unit, a deciding unit, a reduced-size image generating unit, and a display unit. The receiving unit receives a print request. The print data generating unit generates print data for outputting images on print sheets on the basis of the print request that has been received by the receiving unit. The obtaining unit obtains information on the printing speed of a printer that is to print the images on the print sheets on the basis of the print data that has been generated by the print data generating unit. The deciding unit decides, on the basis of the information on the printing speed that has been obtained by the obtaining unit, page intervals at which reduced-size images are to be generated. The reduced-size image generating unit generates, on the basis of the print request that has been received by the receiving unit, at the page intervals that have been decided by the deciding unit, reduced-size images of the images to be output on the print sheets. The display unit displays the reduced-size images that have been generated by the reduced-size image generating unit.

BRIEF DESCRIPTION OF THE DRAWINGS

An exemplary embodiment of the present invention will be described in detail based on the following figures, wherein:

FIG. 10 is a flowchart illustrating the operation of generating thumbnail images at the decided page intervals.

DETAILED DESCRIPTION

An exemplary embodiment of the present invention will be described in detail with reference to the accompanying drawings.

Figure 1:
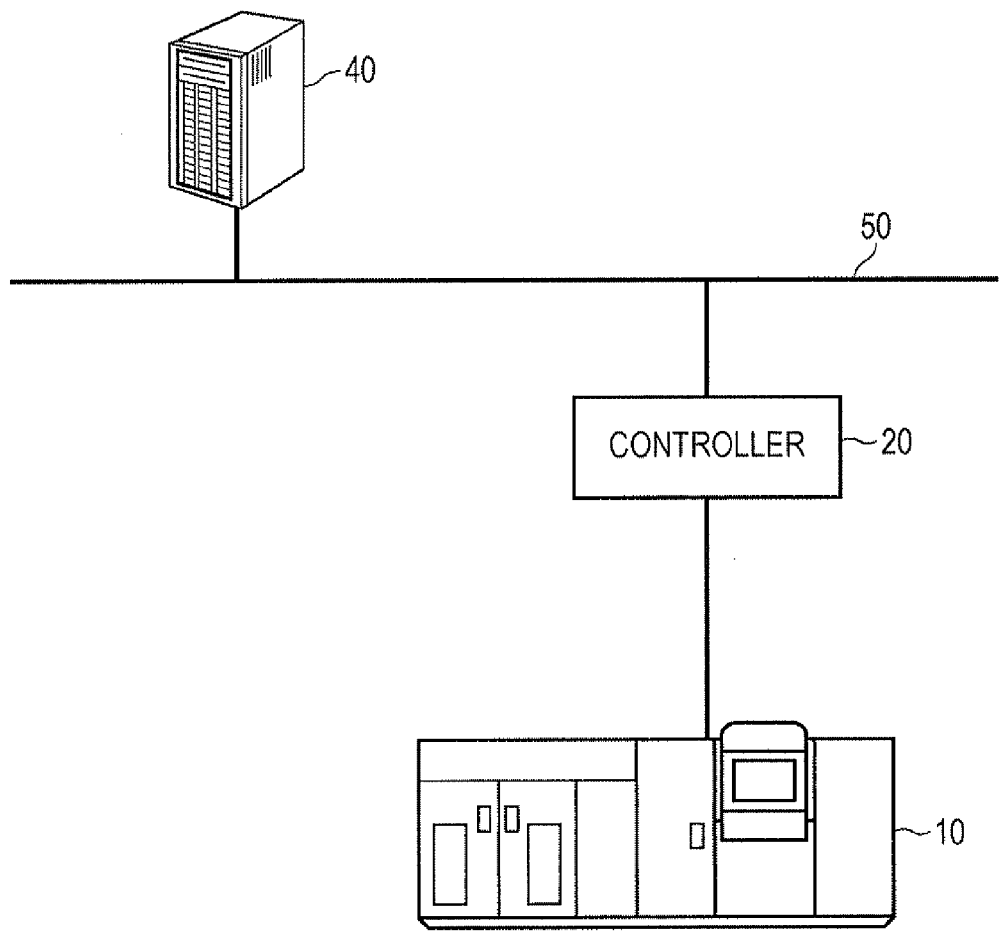
FIG. 1 illustrates the configuration of an image forming system according to an exemplary embodiment of the present invention.

FIG. 1 is a block diagram illustrating the configuration of an image forming system according to an exemplary embodiment of the present invention.

As illustrated in FIG. 1, the image forming system according to the exemplary embodiment of the present invention includes a controller (print control apparatus) 20, a host computer 40, and a printer 10. The controller 20 and the host computer 40 are connected to each other via a network 50. A print job (print request) is sent from the host computer 40 to the controller 20 via the network 50. After receiving the print job from the host computer 40, the controller 20 converts the print job into print data that is printable by the printer 10, and then sends this resultant print data to the printer 10.

Figure 2:
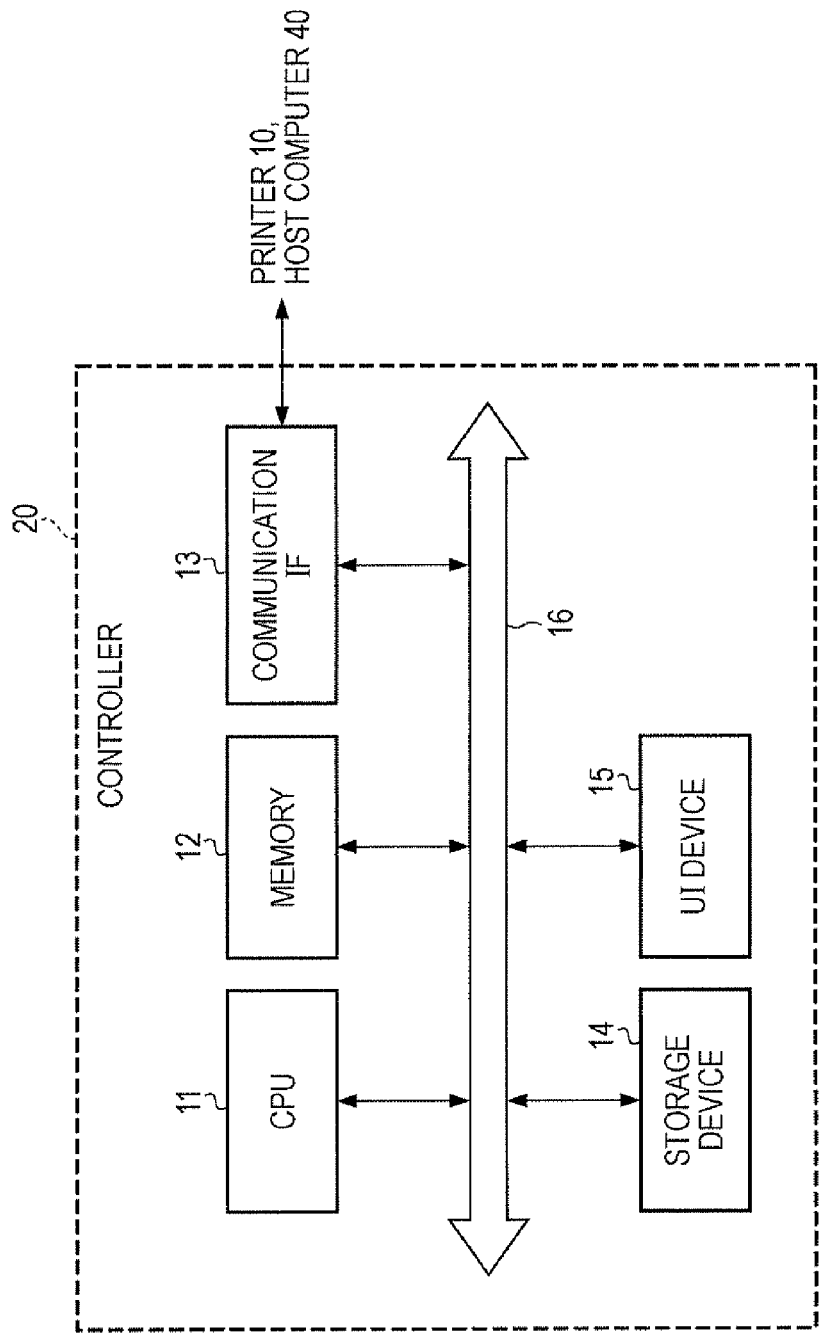
FIG. 2 is a block diagram illustrating the hardware configuration of a controller in the exemplary embodiment of the present invention.

FIG. 2 illustrates the hardware configuration of the controller 20 included in the image forming system according to this exemplary embodiment.

As illustrated in FIG. 2, the controller 20 includes a central processing unit (CPU) 11, a memory 12, a communication interface (IF) 13, a storage device 14 such as a hard disk drive (HDD), and a user interface (UI) device 15. The communication IF 13 sends and receives data to and from external apparatuses via a network. The UI device 15 includes a touch panel or a liquid crystal display and a keyboard. These components are connected to each other via a control bus 16.

The CPU 11 performs a predetermined process in accordance with a control program that is stored in the memory 12 or the storage device 14, thereby controlling the operation of the controller 20. In this exemplary embodiment, it has been described that the control program stored in the memory 12 or the storage device 14 is read and executed by the CPU 11. However, this control program may be supplied to the CPU 11 with being stored on a storage medium, such as a compact disc-read only memory (CD-ROM).

Figure 3:
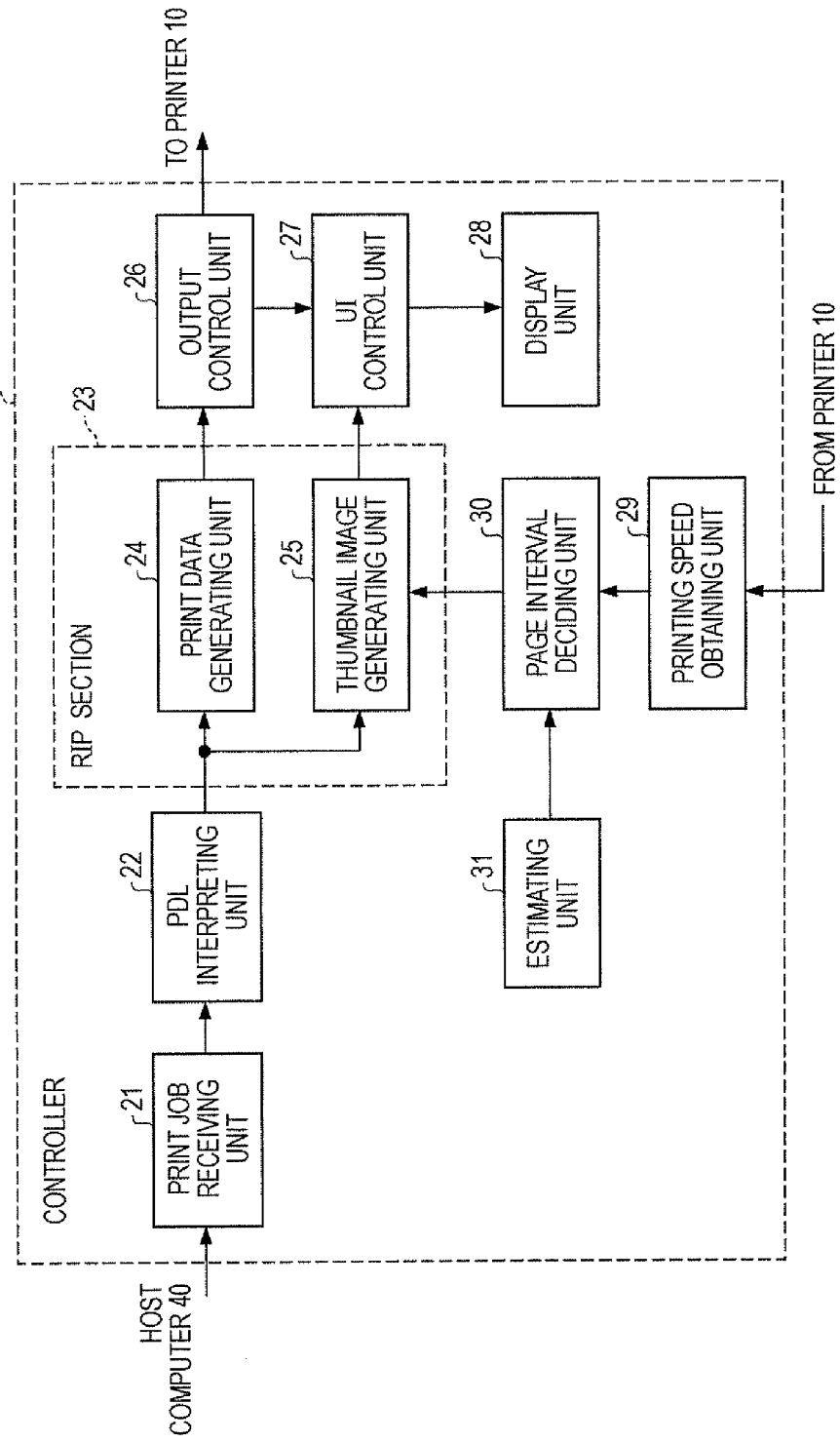
FIG. 3 is a block diagram illustrating the functional configuration of the controller in the exemplary embodiment of the present invention.

FIG. 3 is a block diagram illustrating the functional configuration of the controller 20 that is implemented as a result of execution of the control program.

As illustrated in FIG. 3, the controller 20 in this exemplary embodiment includes a print job receiving unit 21, a page description language (PDL) interpreting unit 22, a raster image processing (RIP) section 23, an output control unit 26, a user interface (UI) control unit 27, a display unit 28, a printing speed obtaining unit 29, a page interval deciding unit 30, and an estimating unit 31. In addition, the RIP section 23 includes a print data generating unit 24 and a thumbnail image (reduced-size image) generating unit 25.

The print job receiving unit 21 receives a print job (print request) that is sent from the host computer 40.

The PDL interpreting unit 22 interprets the PDL that is contained in the print job received by the print job receiving unit 21 so as to generate intermediate data or the like.

By referring to the PDL interpretation result obtained by the PDL interpreting unit 22, the print data generating unit 24 generates print data that is used to output images on print sheets on the basis of the print job received by the print job receiving unit 21. Specifically, based on the print job received by the print job receiving unit 21, the print data generating unit 24 generates raster format image data serving as the print data.

The printing speed obtaining unit 29 obtains information on the printing speed of the printer 10 that prints images on print sheets on the basis of the print data generated by the print data generating unit 24.

Based on the information on the printing speed obtained by the printing speed obtaining unit 29, the page interval deciding unit 30 decides page intervals at which thumbnail images are to be generated. Specifically, the page interval deciding unit 30 decides page intervals at which thumbnail images are to be generated, on the basis of the information on the printing speed obtained by the printing speed obtaining unit 29 and set display intervals at which thumbnail images are to be displayed.

For example, let Ts [seconds] denote display intervals at which thumbnail images are to be displayed on the display unit 28 and let Np [pages/second] denote the printing speed. Then, page intervals Gs [pages] at which thumbnail images are to be generated is calculated by using the following equation.

$$Gs[\text{pages}] = Np[\text{pages/second}] \times Ts[\text{seconds}]$$

For example, suppose that the printing speed of the printer 10 is 50 [pages/second] and the display intervals at which thumbnail images are to be displayed are 2 [seconds]. In this case, the page intervals Gs at which thumbnail images are to be generated are 50×2=100 [pages].

That is, in the case where the printing speed of the printer 10 is 50 [pages/second], the displayed thumbnail image is switched once every 2 seconds if a thumbnail image is generated once every 100 pages.

For example, the display intervals Ts at which thumbnail images are to be displayed may be initially set to a value in the range of 2 to 5 seconds in the system. This value may be changed in accordance with a user setting made with the UI control unit 27.

Based on the print job received by the print job receiving unit 21, the thumbnail image generating unit 25 generates thumbnail images, which are reduced-size images of images to be printed by the printer 10. Thumbnail images are displayed so as to allow the user to check whether a printing process is being successfully performed. Thus, thumbnail images have a smaller size than images of print data and have a lower resolution than the images of print data. For example, when images for print data are generated to have a resolution in the range of 600 to 1200 dots per inch (dpi), thumbnail images are generated to have a resolution of approximately 100 dpi.

Based on the print job received by the print job receiving unit 21, the thumbnail image generating unit 25 generates, at the page intervals decided by the page interval deciding unit 30, thumbnail images of images to be output on print sheets while skipping generation of some thumbnail images. Specifically, the thumbnail image generating unit 25 generates thumbnail images of pages per the page intervals decided by the page interval deciding unit 30 but skips generation of thumbnail images for print data of pages between these pages. The thumbnail image generating unit 25 then transfers data of each generated thumbnail image and information on the page number thereof to the UI control unit 27.

The output control unit 26 controls the printer 10 so that images based on the print data generated by the print data generating unit 24 are output.

The UI control unit 27 controls the display unit 28 in accordance with instructions from the output control unit 26 so that the thumbnail images generated by the thumbnail image generating unit 25 are displayed in synchronization with timings at which corresponding images are printed by the printer 10.

Figure 4:
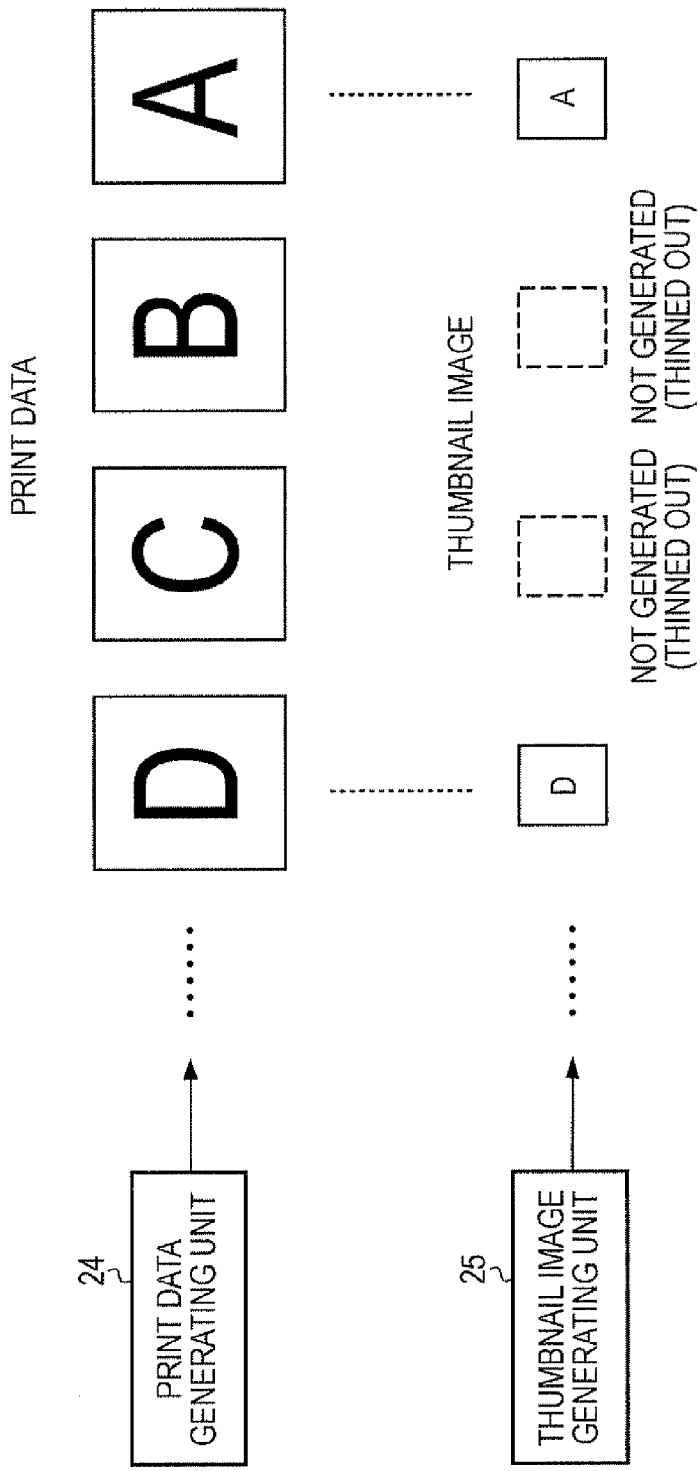
FIG. 4 describes generation of print data performed by a print data generating unit and generation of thumbnail images performed by a thumbnail image generating unit.
Figure 5:
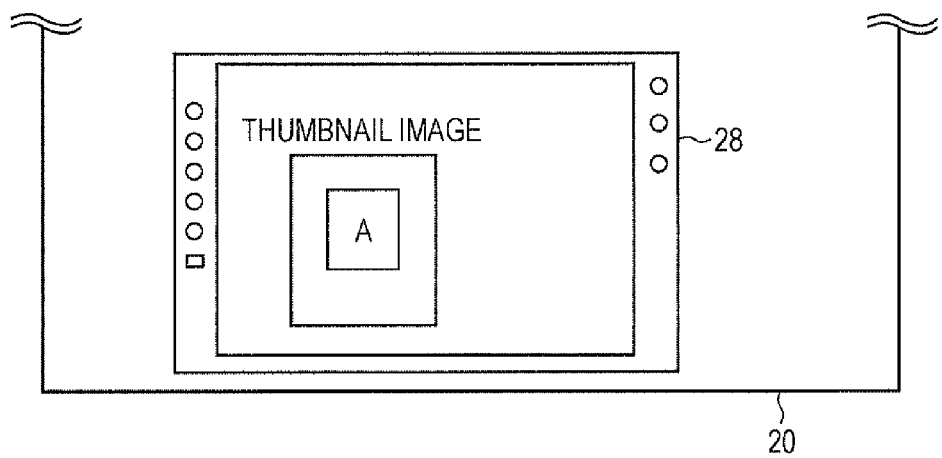
FIG. 5 illustrates a generated thumbnail image that is displayed on a display unit of the controller.

For example, suppose that pieces of print data are generated by the print data generating unit 24 and thumbnail images are generated by the thumbnail image generating unit 25 in a manner as illustrated in FIG. 4. In this case, the UI control unit 27 controls the display unit 28 so that a thumbnail image for the character "A" is displayed, as illustrated in FIG. 5, in synchronization with a timing at which print data for the character "A" is printed by the printer 10.

In this way, under control of the UI control unit 27, the display unit 28 sequentially displays the thumbnail images generated by the thumbnail image generating unit 25.

In the example illustrated in FIG. 4, thumbnail images are generated for every three pages. Thumbnail images corresponding to pieces of print data of the characters "B" and "C" are thinned out and are not generated.

There may be a case where an instruction of a print job sent from the host computer 40 is to repeatedly print a printed-material set constituted by multiple pages. In such a case, the page interval deciding unit 30 decides the value of the page intervals at which thumbnail images are to be generated so that the value of the page intervals is not a divisor or multiple of the number of pages of one printed-material set contained in the print job.

That is, the page interval deciding unit 30 modifies the page interval Gs decided by using the above-described method or the like so that the end of one printed-material set constituted by multiple pages does not match the page intervals at which thumbnail images are to be generated.

For example, suppose that the number of pages of one printed-material set is five pages and the page interval Gs that has been decided on the basis of the printing speed by using the above-described method or the like is 50 pages. In this case, the number of pages (five pages) of one printed-material set is a divisor of the page interval Gs (50 pages). Thus, the page interval Gs is modified to a value, such as 49 pages or 51 pages.

In the above case, the page interval deciding unit 30 may periodically shift the page interval Gs instead of simply modifying the page interval Gs.

Specifically, the page interval deciding unit 30 uses, as the center value, the page interval Gs that has been decided on the basis of the printing speed by using the above-described method or the like. The page interval deciding unit 30 then decides, as page intervals at which thumbnail images are to be generated, a page interval Gs2 that is calculated by using the following equation.

$$Gs2[\text{pages}] = Gs(Sn \bmod 3) - 1$$

Here, "Sn" denotes the total number of thumbnail images that have been generated up to this time point, whereas "mod" denotes the modulo operation. That is, "Sn mod 3" denotes the remainder that is obtained when Sn is divided by 3.

Alternatively, the page interval deciding unit 30 may shift, randomly by using random numbers, the page intervals Gs at which thumbnail images are to be generated.

As described above, in the case where an instruction of the print job sent from the host computer 40 is to repeatedly print a printed-material set constituted by multiple pages, the number of pages of this one set may be input by the user via the U1 control unit 27 or the number of pages of one set estimated by the estimating unit 31 may be used.

A description will be given below of a specific method performed by the estimating unit 31 to estimate the number of pages of one printed-material set contained in a print job.

Figure 6:
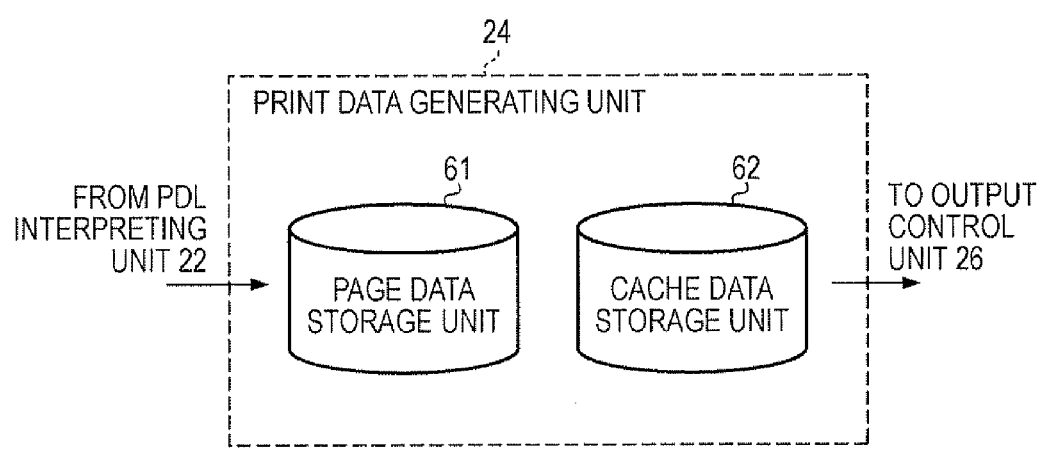
FIG. 6 describes the configuration of the print data generating unit.

Referring to FIG. 6, the configuration of the print data generating unit 24 will be described. As illustrated in FIG. 6, the print data generating unit 24 includes a page data storage unit 61, and a cache data storage unit 62. The page data storage unit 61 stores page data, which is variable data that differs from page to page. The cache data storage unit 62 stores, as cache data, fixed data that is used for every page in common. That is, the cache data storage unit 62 is a storage area for temporarily storing data that is to be repeatedly used.

Based on the creation state of data to be stored in the cache data storage unit 62, the estimating unit 31 estimates the number of pages of one printed-material set contained in the print job.

When one printed-material set is constituted by multiple pages, pages that are mainly constituted by variable data and pages that are mainly constituted by fixed data are periodically repeated. For example, fixed data, such as those for frames, lines, and advertisements, is stored in the cache data storage unit 62 as cache data, and is repeatedly used. On the other hand, variable data, such as address data and user name data, which differs from page to page is stored in the page data storage unit 61. Thus, it is possible to estimate the number of pages of one printed-material set by observing whether data used to generate print data of each page is constituted by cache data or variable data.

Figure 7:
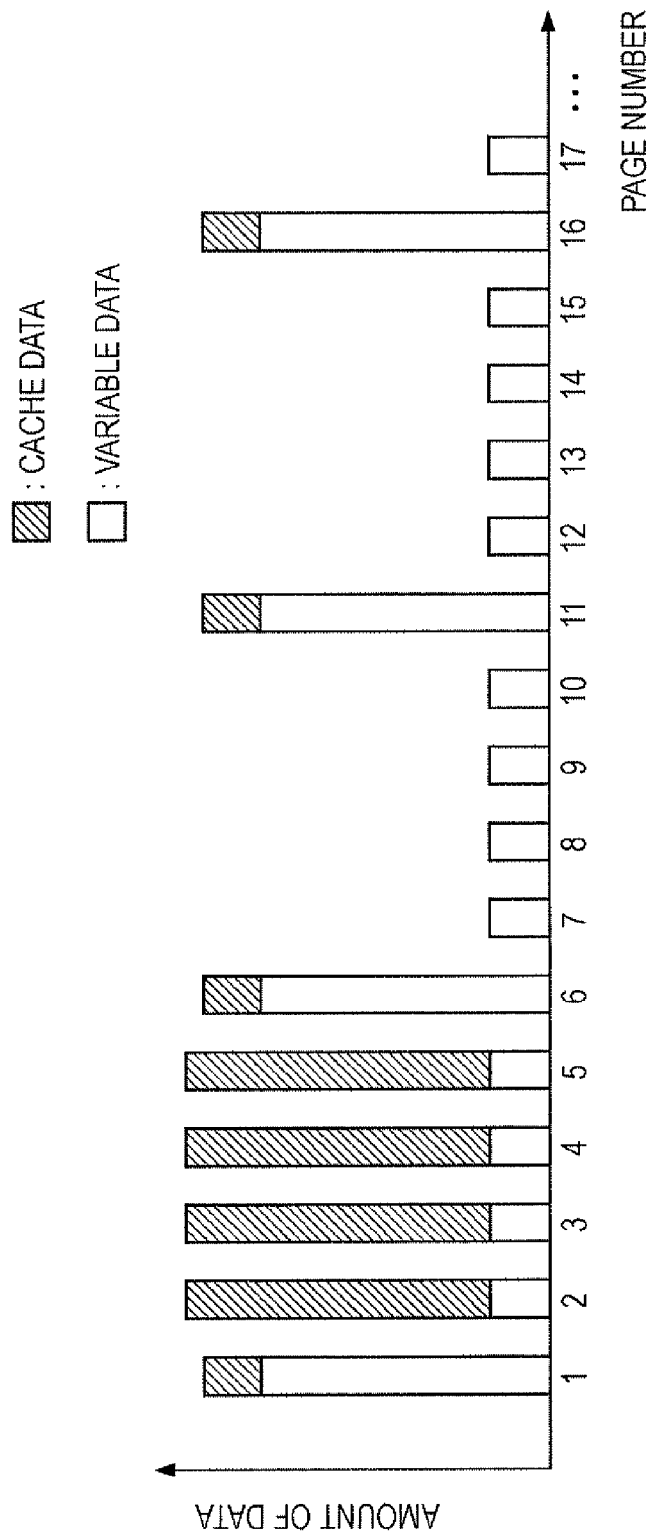
FIG. 7 illustrates, for each page, examples of the amount of generated print data and the amount of cache data to be stored in a cache data storage unit.

For example, suppose that the amount of print data generated for each page and the amount of cache data to be stored in the cache data storage unit 62 for the page are as illustrated in FIG. 7. The observed result permits the estimating unit 31 to estimate that the number of pages of one printed-material set contained in this print job is five pages.

From the similar reason, the estimating unit 31 is able to estimate the number of pages of one printed-material set by observing the cache hit rate of each page, which is a rate at which cache data stored in the cache data storage unit 62 is used. That is, the estimating unit 31 estimates the number of pages of one printed-material set contained in the print job, on the basis of the usage state of data that is stored in the cache data storage unit 62.

Figure 8:
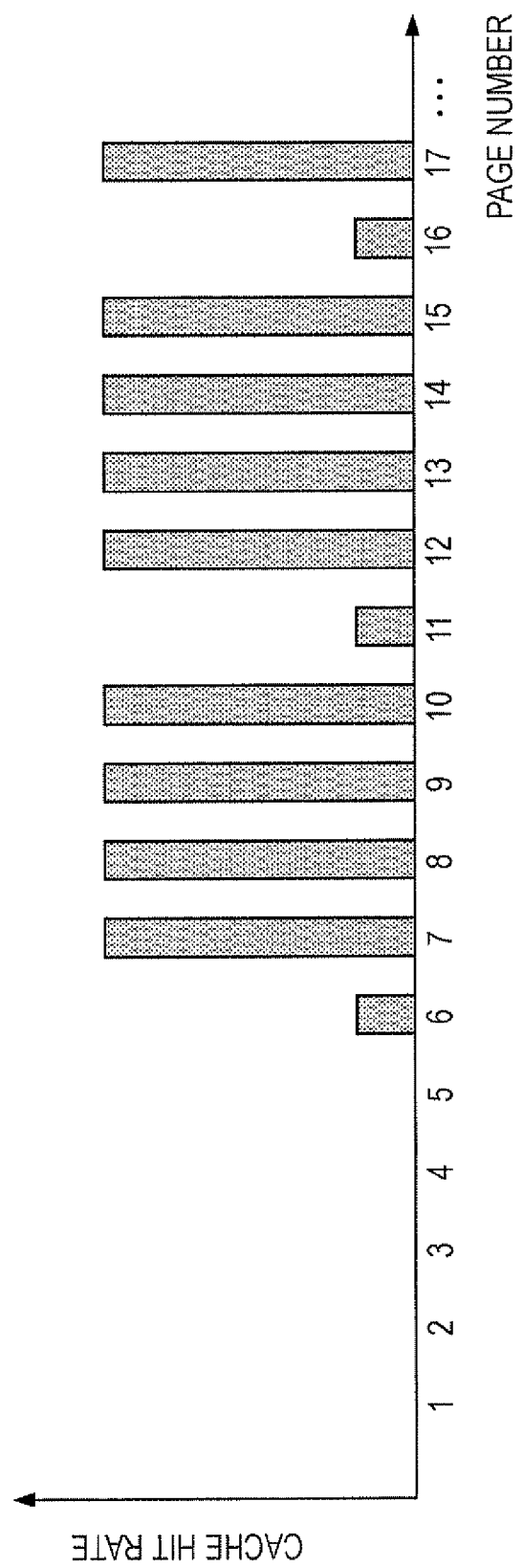
FIG. 8 illustrates an example of the cache hit rate for each page.

For example, suppose that the cache hit rate of each page is as illustrated in FIG. 8. In this case, the observed result permits the estimating unit 31 to estimate that the number of pages of one printed-material set contained in this print job is five pages.

Now referring to flowcharts of FIGS. 9 and 10, the operation of the controller 20 in this exemplary embodiment will be described.

Figure 9:
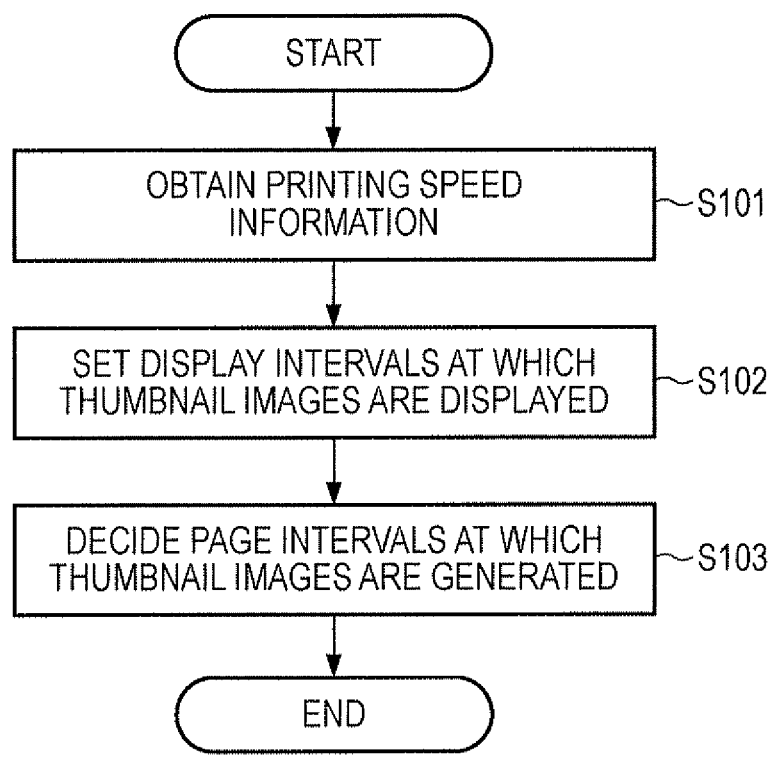
FIG. 9 is a flowchart illustrating the operation of deciding page intervals at which thumbnail images are to be generated.

FIG. 9 is a flowchart illustrating the operation of deciding page intervals at which thumbnail images are to be generated. FIG. 10 is a flowchart illustrating the operation of generating thumbnail images at the decided page intervals.

Referring to FIG. 9, a description will be first given of the operation of deciding page intervals at which thumbnail images are to be generated.

The printing speed obtaining unit 29 obtains information on the printing speed of the printer 10 (step S101). Then, display intervals at which thumbnail images are to be displayed are set (step S102). Thereafter, the page interval deciding unit 30 decides page intervals at which thumbnail images are to be generated, on the basis of the information on the printing speed obtained by the printing speed obtaining unit 29 and the set display intervals at which thumbnail images are to be displayed (step S103).

Referring to FIG. 10, a description is now given of the operation of generating thumbnail images at the decided page intervals.

Once the RIP section 23 obtains data of the first page of the received print job (step S201), the print data generating unit 24 generates print data of the page (step S202).

The thumbnail image generating unit 25 then determines whether or not the current page number is the page number for which a thumbnail image is to be generated (step S203).

If it is determined in step S203 that the current page number is not the page number for which a thumbnail image is to be generated (NO in step S203), data of the next page is obtained (step S207). The print data generating unit 24 then generates print data of the page on the basis of the obtained data (step S202).

If it is determined in step S203 that the current page number is the page number for which a thumbnail image is to be generated (YES in step S203), the thumbnail image generating unit 25 generates a thumbnail image of the page (step S204), and sends data of the generated thumbnail image to the UI control unit 27 (step S205). The UI control unit 27 in turn displays the thumbnail image on the display unit 28.

Subsequently, it is determined whether or not all pages have been processed (step S206). If it is determined that all pages have not been processed, data of the next page is obtained (S207). Thereafter, the processing from step S202 to S205 is repeated.

MODIFICATIONS

While the description has been given, in the above exemplary embodiment, of the case where page intervals at which thumbnail images are to be generated are decided in advance, the present invention is not limited to this configuration. There are printers whose printing speed varies from when they start printing to when they enter the stable printing state. The present invention is similarly applicable to a case where page intervals at which thumbnail images are to be generated are altered in real time in accordance with the change in the printing speed of the printer 10.

When such a configuration is adopted, the printing speed obtaining unit 29 continuously obtains information on the printing speed of the printer 10 while a printing process is being performed. Also, the page interval deciding unit 30 dynamically decides page intervals at which thumbnail images are to be generated, on the basis of the information on the printing speed obtained by the printing speed obtaining unit 29 and the set display intervals at which thumbnail images are to be displayed.

Specifically, immediately before the thumbnail image generating unit 25 generates a thumbnail image, the printing speed obtaining unit 29 obtains the information on the printing speed of the printer 10 and the page interval deciding unit 30 decides page intervals at which thumbnail images are to be generated.

While the description has been given, in the above exemplary embodiment, of the case where print data and thumbnail image data are generated by one RIP section 23, the present invention is not limited such a configuration. Print data and thumbnail image data may be generated separately by different RIP sections. In particular, controllers of superfast printers have a high processing load due to a print data generation process. If it is configured that another RIP section performs a thumbnail image generation process, a load of the thumbnail image generation process is not to be imposed on the RIP section that performs the print data generation process.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A print control apparatus comprising:
    a receiving unit that receives a print request;
    a print data generating unit that generates print data for outputting images on print sheets on the basis of the print request that has been received by the receiving unit;
    an obtaining unit that obtains information on the printing speed of a printer that is to print the images on the print sheets on the basis of the print data that has been generated by the print data generating unit;
    a deciding unit that decides, on the basis of the information on the printing speed that has been obtained by the obtaining unit, page intervals at which reduced-size images are to be generated;
    a reduced-size image generating unit that generates, on the basis of the print request that has been received by the receiving unit, at the page intervals that have been decided by the deciding unit, reduced-size images of the images to be output on the print sheets; and
    a display unit that displays the reduced-size images that have been generated by the reduced-size image generating unit.

2. The print control apparatus according to claim 1, wherein the deciding unit decides a value of the page intervals at which reduced-size images are to be generated such that the value of the page intervals is not a divisor or multiple of the number of pages of one printed-material set in the print request.

3. The print control apparatus according to claim 2,
    wherein the print data generating unit includes a cache data storage area for temporarily storing data that is to be repeatedly used, and
    wherein the print control apparatus further comprises an estimating unit that estimates, on the basis of the creation state of data to be stored in the cache data storage area, the number of pages of one printed-material set in the print request.

4. The print control apparatus according to claim 2,
    wherein the print data generating unit includes a cache data storage area for temporarily storing data that is to be repeatedly used, and
    wherein the print control apparatus further comprises an estimating unit that estimates, on the basis of the usage state of data that is stored in the cache data storage area, the number of pages of one printed-material set in the print request.

5. The print control apparatus according to claim 1,
    wherein the obtaining unit continuously obtains, while a printing process is being performed, the information on the printing speed of the printer that is printing the images on the print sheets on the basis of the generated print data, and
    wherein the deciding unit dynamically decides page intervals at which reduced-size images are to be generated, on the basis of the information on the printing speed that has been obtained by the obtaining unit and set display intervals of reduced-size images.

6. The print control apparatus according to claim 2,
    wherein the obtaining unit continuously obtains, while a printing process is being performed, the information on the printing speed of the printer that is printing the images on the print sheets on the basis of the generated print data, and
    wherein the deciding unit dynamically decides page intervals at which reduced-size images are to be generated, on the basis of the information on the printing speed that has been obtained by the obtaining unit and set display intervals of reduced-size images.

7. The print control apparatus according to claim 3,
    wherein the obtaining unit continuously obtains, while a printing process is being performed, the information on the printing speed of the printer that is printing the images on the print sheets on the basis of the generated print data, and
    wherein the deciding unit dynamically decides page intervals at which reduced-size images are to be generated, on the basis of the information on the printing speed that has been obtained by the obtaining unit and set display intervals of reduced-size images.

8. The print control apparatus according to claim 4,
    wherein the obtaining unit continuously obtains, while a printing process is being performed, the information on the printing speed of the printer that is printing the images on the print sheets on the basis of the generated print data, and
    wherein the deciding unit dynamically decides page intervals at which reduced-size images are to be generated, on the basis of the information on the printing speed that has been obtained by the obtaining unit and set display intervals of reduced-size images.

9. An image forming system comprising:
    a receiving unit that receives a print request;
    a print data generating unit that generates print data for outputting images on print sheets on the basis of the print request that has been received by the receiving unit;
    a printer that outputs, on the print sheets, the images based on the print data that has been generated by the print data generating unit;
    an obtaining unit that obtains information on the printing speed of the printer that is to print the images on the print sheets on the basis of the print data that has been generated by the print data generating unit;
    a deciding unit that decides, on the basis of the information on the printing speed that has been obtained by the obtaining unit, page intervals at which reduced-size images are to be generated;
    a reduced-size image generating unit that generates, on the basis of the print request that has been received by the receiving unit, at the page intervals that have been decided by the deciding unit, reduced-size images of the images to be output on the print sheets; and
    a display unit that displays the reduced-size images that have been generated by the reduced-size image generating unit.

10. A non-transitory computer readable medium storing a program causing a computer to execute a process, the process comprising:
    generating print data for outputting images on print sheets on the basis of a received print request;

obtaining information on the printing speed of a printer that is to print the images on the print sheets on the basis of the generated print data;

deciding, on the basis of the obtained information on the printing speed, page intervals at which reduced-size images are to be generated;

generating, on the basis of the received print request, at the decided page intervals, reduced-size images of the images to be output on the print sheets; and displaying the generated reduced-size images.

* * * * *